United States Patent [19]

Cook

[11] 4,193,896
[45] Mar. 18, 1980

[54] PROCESS FOR MODIFYING LINEAR POLYMER RESINS

[75] Inventor: William H. Cook, Bloomfield Hills, Mich.

[73] Assignee: Kemerica, Incorporated, Bloomfield Hills, Mich.

[21] Appl. No.: 784,259

[22] Filed: Apr. 4, 1977

[51] Int. Cl.² .................................................. C08J 11/04
[52] U.S. Cl. ..................................... 260/2.3; 528/492; 525/437
[58] Field of Search .......................... 260/2.3, DIG. 43; 528/492, 273

[56] References Cited

U.S. PATENT DOCUMENTS

| | | | |
|---|---|---|---|
| 2,423,032 | 6/1947 | LeBeau | 260/2.3 X |
| 2,921,828 | 1/1960 | Caldwell | 8/4 |
| 3,427,267 | 2/1969 | Stieger et al. | 260/2.3 X |
| 3,699,082 | 10/1972 | Koerner et al. | 260/75 NK |
| 3,767,601 | 10/1973 | Knox | 260/2.3 |
| 3,898,253 | 8/1975 | Buckler et al. | 260/2.3 X |
| 3,928,253 | 12/1975 | Thornton et al. | 260/2.3 |
| 3,932,352 | 1/1976 | Freedman et al. | 260/DIG. 43 X |

Primary Examiner—Carman J. Seccuro
Attorney, Agent, or Firm—Gordon W. Hueschen

[57] ABSTRACT

Linear polymer resins composed of repeating hydrocarbon units linked together by ester or amide linkages are treated with a liquid or gaseous primary or secondary amine under thermal conditions which cause aminolysis of some of the linear linkages to produce polymer resins of reduced average molecular weight. The procedure is applicable to polyesters, such as polycarbonates and polyterephthalates, and to polyamides, such as nylon 66, nylon 6, nylon 11 and nylon 12. The process is particularly applicable to the recovery or recycling of throw-away bottles made of poly(ethylene terephthalate), hereinafter sometimes referred to as PET.

13 Claims, No Drawings

PROCESS FOR MODIFYING LINEAR POLYMER RESINS

BACKGROUND OF THE INVENTION

Field of the Invention

The invention relates to a process for treating linear polymer resins to reduce the molecular weight thereof and is particularly directed to a process for treating linear polymer resins which are composed of repeating hydrocarbon units linked together by ester or amide linkages.

Poly(ethylene terephthalate) resins are commonly used for making clear plastic beverage containers. These containers necessarily are of the throw-away type, as they are not suitable for cleaning and refilling due to sanitary considerations and/or the possibility of polymer degradation during the cleaning process. In principle, the containers could be ground and the granulate cleaned by some means which would not degrade the polymer, and the granulate then used for fabrication of some other article in which sanitary considerations were not pertinent. However, each thermoplastic processing application has its own requirements for polymer processing characteristics, of which the polymer average molecular weight is often the single most important determinant. The average molecular weight of poly(ethylene terephthalate) (PET) used for making beverage containers is relatively high, and is too high for many other applications in which the recovered container polymer might otherwise be used.

Other types of linear polymer resins such as polycarbonate and polyamide resins sometimes present like problems. In the case of polyamides prepared by polymerization of cyclic monomers, such as nylon 6, there is also the problem that in the original production of the polymer the molecular weight obtained sometimes is higher than was desired.

OBJECTS OF THE INVENTION

It is an object of the invention to provide a process for modifying linear polymer resins of the class described. It is a further object of the invention to provide a process for reducing the molecular weight of such resins. It is a further object of the invention whereby such resins after being used can be modified to make them suitable for uses for which the unmodified linear polymer resin is unsuited. A still further object of the invention is to provide a process which obviates the disadvantages of the prior art and which has advantages which will appear as the description proceeds.

BRIEF DESCRIPTION OF THE INVENTION

The invention relates to a process for modifying linear polymer resins composed of repeating hydrocarbon units linked together by ester or amide linkages in which the polymer resin is treated with a primary or secondary amine under conditions which cause aminolysis of the linear linkages characteristic of the polymer resin being treated.

The invention is particularly of advantage in recovery of throw-away beverage containers made of poly(ethylene terephthalate) (PET) and like polyester resins. By grinding these bottles, or otherwise comminuting them to a particle size such that the maximum linear dimension of each particle is in the range of about 0.05 inch to about 0.5 inch, and then treating them with a primary or secondary amine as described hereinafter, a product of lowered molecular weight is obtained which is suitable for uses for which the original PET would have been too expensive. This opens up a whole new field of PET resin usages and avoids the problem of disposal of a non-reusable product. For example, PET beverage container resin recovered by the process of the invention can be advantageously employed in the manufacture of ribbon filaments such as are suited to the manufacture of carpet backing. Virgin PET is too expensive to be used alone in most carpet backing, but sometimes is blended with other ribbon filament materials, such as polypropylene, to improve dyeability and other characteristics. Recovered PET, being much less expensive than virgin polymer, can be employed economically in greater proportions or as the sole ribbon filament backing material.

In carrying out the process of the invention, the linear polymer resin of the class described is exposed to a primary or secondary amine under conditions effective to cause diffusion of the amine throughout the polymer and then, simultaneously therewith or subsequently thereto, the amine-treated polymer is heated for a time at a temperature effective to cause the desired degree of scission of the ester or amide linkages, as the case may be, by aminolysis.

Effective diffusion of the amine into the polymer resin may be facilitated by increasing the surface of the amine-exposed resin. This can be accomplished by dissolving the resin in a suitable inert solvent, or by comminuting it. Inasmuch as it is generally difficult and/or impractical to remove solvent completely from high molecular weight polymers, it is not usually advantageous to achieve diffusion by means of dissolution of the polymer unless the polymer, after treatment, is to be used in dissolved form, as in the casting of films. If the intended application of the polymer after treatment is in a thermoplastic processing operation or other application requiring solvent-free solid polymer, it is of advantage to place the resin in particulate form by grinding or otherwise comminuting it and exposing the divided resin to the amine.

In the process, the amine attacks the ester or amide linkages and breaks down at least some of the polymer chains into chains of lower molecular weight. As a result, a product having a lowered average molecular weight is obtained. A particularly surprising aspect of the invention is the discovery that certain amines diffuse readily into the resin particles without causing them to stick or adhere together. The polymer may be heated to speed up this diffusion but, advantageously, not to a temperature which would cause aminolysis to take place. After adequate diffusion is obtained, or simultaneously therewith, the temperature of the amine-treated resin is gradually raised to a level at which aminolysis takes place and held at that temperature until the desired degree of reduction of molecular weight is obtained. Ordinarily, it will not be necessary or advisable to heat above about 120° C. or below about 60° C. Higher temperatures, however, can be used as long as discoloration or degradation by other mechanisms does not occur. Also, lower temperatures can be used, but the time required to effect the desired reduction in molecular weight may be disproportionately long.

Following the aminolysis period and before cooling the treated polymer resin to ambient temperature, it is often desirable to apply vacuum to the treated particulate solid to evaporate any excess unreacted amine.

Even small amounts of residual amine often provide a noticeable and/or objectionable odor, and are likely to cause further molecular weight reduction, which usually will not be desirable, in the course of subsequent thermoplastic processing or other exposure of the polymer to elevated temperatures. The time of such evacuation needed for satisfactory removal of residual amine depends on such factors as the identities of the polymer and amine, the temperature at which the vacuum is applied and the degree of vacuum applied. In general the pressure should be as low as possible, advantageously below 20 mm Hg and if possible and practical, below 10 mm Hg. Usually, one hour 10–20 mm Hg with the resin at 60–100° C. is sufficient unless the amine employed has a particularly high affinity for the polymer being treated.

Given an appropriate choice of amine for treating the polymer in question, the amount of amine required to effect its purpose in the process of the invention is relatively small. Effective reduction in molecular weight ordinarily is obtained with less than 1 weight percent of amine, based on dibutylamine and the weight of the polymer. Higher amounts, up to 5 to 10 percent can be used, especially where great reduction in molecular weight is desired, but in general it is not necessary or desirable to exceed about 2 percent. Any lesser amount can be used, and as the amount of amine is reduced, given the other conditions of the treatment, the amount of reduction in molecular weight of the polymer is in general proportionately decreased. In general, it is not necessary or desirable to employ less than about 0.01 percent amine. It is to be understood that these proportions are based on dibutylamine and that where other amines are used, the proportions can be either increased or decreased proportionately as the amine has an effective equivalent weight higher or lower, respectively, than dibutylamine.

In carrying out the process of the invention, any basic primary or secondary amine, advantageously one having a $pK_b$ less than about 6, can be employed. The term amine as used herein is to be understood as referring to amines of this type. Suitable such secondary amines include dimethylamine, methylethylamine, diethylamine, ethylpropylamine, methylpropylamine, ethylisopropylamine, methylisopropylamine, dipropylamine, diisopropylamine, methylcyclohexylamine, dibutylamine, diisobutylamine, methylbutylamine, ethylbutylamine, diamylamine, dihexylamine, dicyclohexylamine, diheptylamine, dioctylamine, di-2-ethylhexylamine, piperidine, tetrahydropyrrole, morpholine, N-methylethanolamine, diethanolamine, 2,6-dimethylmorpholine, methylbenzylamine, and dibenzylamine. Suitable primary amines include methylamine, ethylamine, propylamine, isopropylamine, butylamine, isobutylamine, sec-butylamine, amylamine, isoamylamine, hexylamine, heptylamine octylamine, 2-ethylhexylamine, cyclohexylamine, benzylamine, 2-methoxyethylamine, 2-ethoxyethylamine, decylamine, dodecylamine and tridecylamine.

Amines which are liquid at ambient temperature can be absorbed on the polymer granules and allowed to diffuse into the granules. Gaseous amines, such as dimethylamine, can be employed in a closed system, preferably in a pressure vessel. In such an instance it may be necessary to employ a substantial excess of amine so as to create a super-atmospheric pressure of amine vapor over the polymer if the vapor is not readily absorbed by the polymer. Alternatively, any suitable amine can be dissolved in an inert solvent which is a non-solvent for the polymer and the solution absorbed on the solid.

DETAILED DESCRIPTION OF THE INVENTION

The invention may be more fully understood by reference to the following examples which are given by way of illustration only. Parts and percentages are by weight unless otherwise specified.

EXAMPLE 1

This example shows that the average molecular weight of PET, as reflected by solution viscosity, can be reduced by treatment of the polymer in the solid state with seconary aliphatic amines at an elevated temperature. It is shown further that different secondary aliphatic amines are of unequal effectiveness in this regard, but that each of those investigated, effects at least a measurable molecular weight reduction under moderate conditions of temperature.

The sample of PET employed in Example 1 was obtained from Eastman Chemical Products, Inc. It was designated "SC902-44A" and was claimed to be of about 21,500 number average molecular weight ($\overline{M}_n$). The sample was received in the form of clear, colorless cylindrical pellets.

Part A-1

As a control experiment, 50 g of the poly(ethylene terephthalate) (PET) was weighed into a half-pint paint can. The can was closed and placed in an oven at room temperature. The oven was turned on immediately, and in 25 minutes the air temperature had reached 70° C. The can was removed from the oven briefly, shaken, and replaced in the oven. After 15 minutes longer, the temperature had reached 93° C. and was increasing only slowly. The can was left in the oven overnight. Twenty hours after the oven had first reached 70° C. the can was removed from the oven and shaken while warm. There was no tendency for the pellets to stick together. Upon opening the can, it was noted that the pellets had become an opaque white color, presumably due to partial crystallization of the polymer, as the oven temperature had been well above the glass transition temperature of PET.

The solutions of the polymer then were prepared with gentle stirring and heating in a solvent consisting of 60% phenol and 40% trichloroethylene by weight. One solution was 10.0% non-volatile solids (NVS), and the other was 7.69% NVS. To compensate for evaporation losses during dissolution, trichloroethylene was added as necessary after the solutions had cooled to near room temperature to provide the above-mentioned concentrations of polymer. The viscosities of the solutions then were measured with a Brookfield RVT Viscometer using the #2 spindle at 50 rpm. The viscosity of the 10.0% NVS solution at 25.5° C. was 128 cps, and that of the 7.69% NVS solution was 92.8 cps at 25.0° C.

PART B-1

To a 50 g portion of the PET was added 0.42 ml of dibutylamine (2.5 millimole). This was done in strict analogy to Part A-1 in order to determine the effect of the dibutylamine on the solution viscosity of the polymer. Upon adding the dibutylamine from a syringe to the pellets in the can, it was noted that the amine seemed to wet the surface of the pellets, but did not cause them to stick together. The can was closed immediately, shaken for several minutes, and otherwise kept side by side with the can of Part A-1 at all times. There was no evidence of sticking when the can was removed from the oven at 70° C. and shaken, nor when it was removed at the end of the 20-hour heating period. Upon opening the can, the pellets were found to be an off-white opaque color. As in Part A-1, solutions were prepared by dissolving 25 g of polymer in 225 g solvent, and 20 g polymer in 240 g solvent to provide, respectively, 10.0% NVS and 7.79% NVS. The viscosity of the 10.0% solution was 108 cps at 25.5° C., and that of the 7.69% solution, 78.4 cps at 25.0° C.

PART C-1

Similarly, 50 g of PET was treated with 0.25 ml (2.5 millimole) of diethylamine. Like the dibutylamine, diethylamine clearly wet the surface of the pellets, but did not cause sticking. There also was no sticking at 70° C., but after the 20 hours of heating there were clusters of pellets which broke up upon shaking the can. The pellets were similar in appearance to those treated with dibutylamine. The viscosity of the 10.0% solution of the product at 25.5° C. was 124 cps, and that of the 7.69% solution 89.8 cps at 25.0° C.

PART D-1

Similarly, 50 g of PET was treated with 0.22 ml (2.5 millimole) of morpholine. The morpholine immediately caused the pellets to stick together and to become slightly opaque, presumably indicating solvent attack on the amorphous polymer. However, there was no sticking noticed upon shaking the can at 70° C., nor upon opening it at the end of the 20-hour heating period. As in Parts A-1, B-1, and C-1, two solutions of the polymer were prepared. The 10.0% solution, however, crystallized rapidly just above room temperature, and its viscosity could not be determined at 25.5° C. The viscosity of the 7.69% solution was found to be 74.4 cps at 25.0° C. By extrapolation, using the viscosity ratio at the two concentrations for the control sample of Part A-1, the viscosity of the 10.0% solution at 25.5° C., had it remained liquid, was calculated to be 102.6 cps.

Morpholine was judged to be the most effective of the three amines of Example 1 in effecting reduction of molecular weight of PET under the time/temperature/pressure conditions employed as a result of its affinity for the polymer, relatively high boiling point (128° C.), and its low molecular weight and favorable steric features with respect to aminolysis of esters. The relatively low effectiveness of diethylamine, in spite of its low molecular weight and favorable steric features, is attributed to its apparent lower affinity for the polymer and its low boiling point (56.3° C.), which was below the heating temperature. Much of the diethylamine may have remained in the vapor phase inside the can, rather than being absorbed by the polymer. Under such conditions it would tend to act mostly on the surface of the polymer pellets, which could account for the sticking which was noted when the can was removed from the oven at the end of the heating period but not after brief heating to 70° C. With respect to these theoretical "effectiveness criteria" dibutylamine is intermediate, in agreement with its observed intermediate action on the PET.

EXAMPLE 2

Parts A-1 and D-1 of Example 1 were repeated using as the linear polymer resin PET obtained by grinding used PET bottles to an average particle size of five mesh.

As in Parts A-1 and D-1, the morpholine treatment gave a product having a lower solution viscosity than that obtained by the polymer resin treated the same way, except for the morpholine.

In place of the PET in the above examples, there may be substituted other polyester resins such as poly(1,4-butylene terephthalate), poly(hexamethylene terephthalate), and other polyesters and co-polyesters where the alkylene moieties include such radicals as $-(CH_2)_{\overline{n}}$ where preferably n is from 2 to 6, the 1,4-cyclohexanedimethyl radical, $-CH_2C_6H_{10}CH_2-$, and the 2,2-dimethyl-1,3-propylene radical; and, the dioate moieties include preferably the terephthalate, isophthalate, cyclohexane-1,4-dicarboxylate, adipate and carbonate moieties. Polyesters and copolyesters prepared by polymerization of lactones such as epsilon-caprolactone also are well suited to the process of the invention. Also, the PET can be substituted by polyesteramides and by polyamide resins such as nylon 6, nylon 11, and nylon 12.

It is to be understood that the invention is not to be limited to the exact details of operation or structure shown and described, as obvious modifications and equivalents will be apparent to one skilled in the art.

I claim:

1. A process for treating a starting polymer resin composed of repeating hydrocarbon units linked together by amide or ester linear linkages in order to reduce the molecular weight thereof, which comprises treating the linear polymer resin with a basic primary or secondary amine under conditions which cause aminolysis of said linear linkages and recovering as product linear polymer resin also composed of hydrocarbon units linked together by amide or ester linear linkages, but having a lower average molecular weight than said starting linear polymer.

2. The process of claim 1, in which the first contact between the amine and the linear polymer resin is with the linear polymer resin in a solid particulate state.

3. The process of claim 2, in which the mixture of amine and particulate resin is first heated below the temperature at which substantial aminolysis takes place in order to promote diffusion of amine into the polymer and thereafter to a temperature at which substantial aminolysis takes place in order to promote scission of the linear linkages by aminolysis.

4. The process of claim 3, in which the admixture is first heated to a temperature not greater than about 60° C. and thereafter at a temperature sufficiently above that used in the first stage to promote aminolysis but not substantially greater than about 120° C.

5. The process of claim 4, in which the amine is morpholine.

6. The process of claim 4, in which the amine and particulate polymer resin and admixed and tumbled in a closed container during which time the temperature is gradually raised until it reaches a temperature at which aminolysis takes place.

7. The process of claim 6, in which the amount of amine is between about 0.01 and about 10 percent based on the weight of the polymer resin.

8. The process of claim 7, in which the amine is morpholine.

9. The process of claim 7, in which the polymer resin is poly(ethylene terephthalate).

10. The process of claim 9, in which the amine is morpholine.

11. The process of claim 1, in which throw-away containers made of poly(ethylene terephthalate) are comminuted to a particle size such that the maximum linear dimension of any particle is in the range of about 0.05 inch to about 0.5 inch, heated in the solid state in the presence of a basic primary or secondary amine at a temperature below that at which substantial aminolysis takes place and until diffusion of the amine into and throughout the poly(ethylene terephthalate) is obtained, and thereafter heated at a temperature sufficient to cause aminolysis of ester linkages until substantial reduction in molecular weight is obtained.

12. A modified polymer of lowered molecular weight resin prepared by reaction of a starting polymer resin in the solid state with substantially uniformly absorbed morpholine said starting polymer resin being composed of repeating hydrocarbon units linked together by amide or ester linkages, and said reaction with morpholine comprising scission of some of said ester or amide linkages of the starting polymer resin by aminolysis.

13. The reclaimed polymer resin of claim 12, in which the polymer resin is poly(ethylene terephthalate).

* * * * *

UNITED STATES PATENT AND TRADEMARK OFFICE
CERTIFICATE OF CORRECTION

PATENT NO. : 4,193,896

DATED : March 18, 1980

INVENTOR(S) : William H. Cook

It is certified that error appears in the above—identified patent and that said Letters Patent is hereby corrected as shown below:

Col. 3, line 13; "hour 10-20" should read -- hour at 10-20 --
Col. 4, line 15; "seconary" should read -- secondary --
Col. 4, line 59; "portion" the "t" is not readable.
Col. 6, line 53; "and" (first occurrence) should read -- are --
Col. 8, line 1; "of lowered molecular weight" should be deleted.

Signed and Sealed this

Fifth Day of August 1980

[SEAL]

Attest:

SIDNEY A. DIAMOND

Attesting Officer

Commissioner of Patents and Trademarks